United States Patent
Aesch, Jr.

(10) Patent No.: US 6,612,068 B1
(45) Date of Patent: Sep. 2, 2003

(54) TERMITE LURE AND METHOD

(76) Inventor: Harold W. Aesch, Jr., 915 E. Fork Dr., Phoenix, AZ (US) 85048

( * ) Notice: Subject to any disclaimer, the term of this patent is extended or adjusted under 35 U.S.C. 154(b) by 0 days.

(21) Appl. No.: 10/043,007

(22) Filed: Jan. 8, 2002

(51) Int. Cl.[7] ............................................. A01M 1/20
(52) U.S. Cl. ............................ 43/132.1; 43/121; 43/131
(58) Field of Search .................... 43/132.1, 107, 43/121, 131, 124

(56) References Cited

U.S. PATENT DOCUMENTS

| | | | | |
|---|---|---|---|---|
| 6,016,625 A | * | 1/2000 | Bishoff et al. | 43/107 |
| 6,023,879 A | * | 2/2000 | Katz et al. | 43/124 |
| 6,202,342 B1 | * | 3/2001 | Edwards | 43/132.1 |
| 6,223,465 B1 | * | 5/2001 | Soller et al. | 43/131 |
| 6,298,597 B1 | * | 10/2001 | Koehler et al. | 43/131 |
| 6,357,170 B1 | * | 3/2002 | Bordes, Jr. | 43/121 |
| 6,370,811 B1 | * | 4/2002 | Masterson | 340/573.1 |
| 6,374,536 B1 | * | 4/2002 | Washburn | 43/131 |
| 6,392,545 B2 | * | 5/2002 | Lake et al. | 340/573.1 |
| 6,397,516 B1 | * | 6/2002 | Su | 43/124 |
| 6,453,603 B1 | * | 9/2002 | Baker | 43/124 |

* cited by examiner

Primary Examiner—Peter M. Poon
Assistant Examiner—David Parsley
(74) Attorney, Agent, or Firm—John D. Lister

(57) ABSTRACT

A termite lure for use with an hole passing through a slab includes: a tubular container with an open lower end; a mass of entangled cellulose fibers within the container; a rod having a length greater than that of the container extending through the container; and a retainer, for slidably retaining the container on the rod, that leaves an hole at the lower end of the container through which termites can gain access to the mass of cellulose fibers within the tubular container. The lure may also include an expansible plug that seals the hole in the slab to which the rod may be attached. Preferably, the termite lure is used with a non-repellant termiticide and the lure in placed in the hole with the cellulose fibers in contact with the soil beneath the hole.

8 Claims, 2 Drawing Sheets

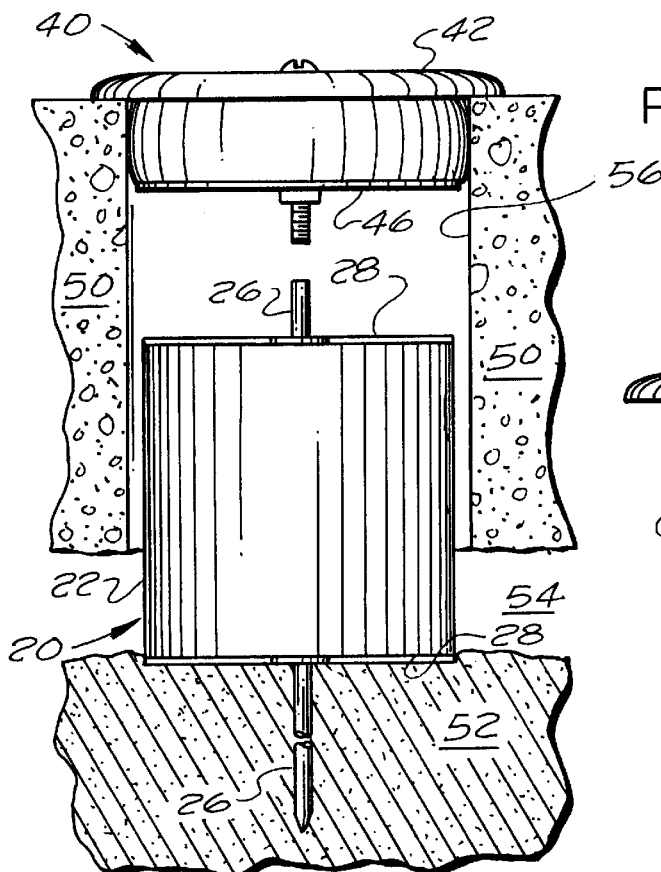
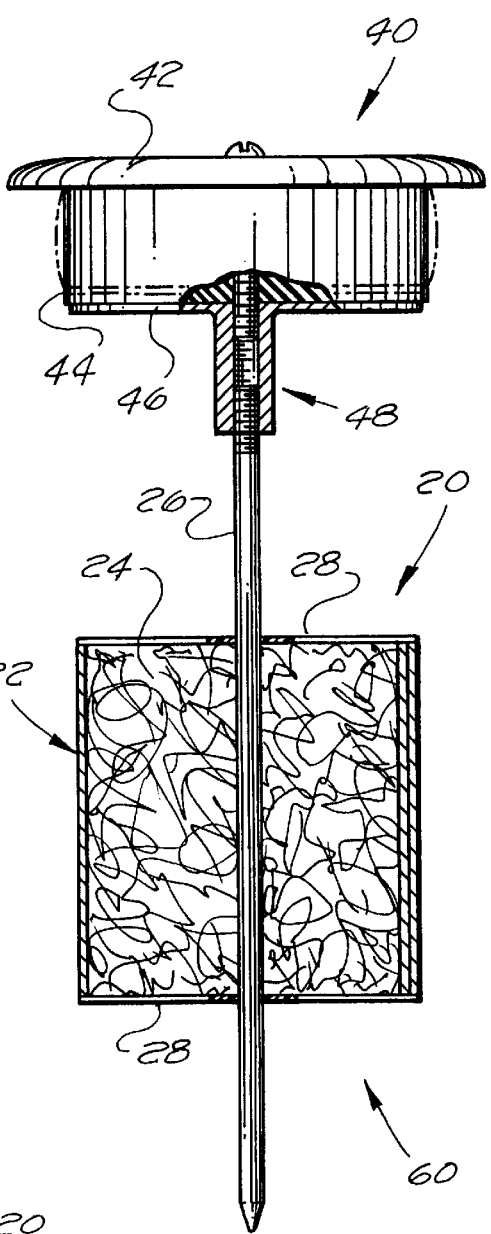
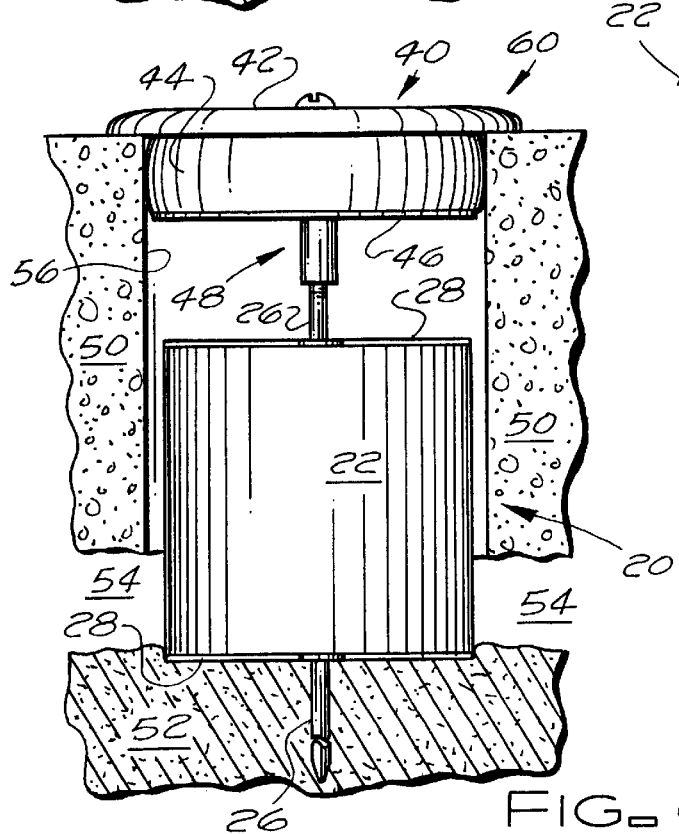

TERMITE LURE AND METHOD

BACKGROUND OF THE INVENTION

The subject invention relates to a termite lure and method of treating a termite colony with a termiticide and, in particular, to a termite lure for use with a building having slabs associated therewith, e.g. concrete slabs, underneath which termites can pass to gain access to the building and a method of utilizing the lure to treat termites with a termiticide.

In many locations, especially in urban environments, office parks, and shopping centers, office, industrial, commercial and other buildings are surrounded with slabs, such as but not limited to concrete slabs, beneath which termites can pass to gain access to the buildings. These slabs are typically concrete slabs about four to six inches thick. One method of treating termites passing under these slabs with termiticides involves boring holes three inches in diameter through the slabs and into the soil beneath the slabs. Wooden sticks about three to four inches long with strings attached thereto are placed down into the holes with the strings extending from the holes so that the sticks can be retrieved when checking for termite activity. Expansible plugs are placed in and seal the upper ends of the holes in the slabs so that rainwater, debris, etc. do not pass down into the holes. The expansible plugs are also used to help keep the strings holding the wooden sticks from falling down into the holes thereby making it hard to retrieve the sticks from the holes to monitor for termite activity.

In spite of the use of the expansible plugs to hold the strings in place so that the strings can be used to retrieve the sticks from the holes to check for termite activity, the strings can fall into the holes when the expansible plugs are removed from the holes thereby making the retrieval of the sticks from the holes through the slabs difficult. In addition, frequently, there is a gap or air space between the soil beneath a slab and the underside of a slab. A stick can become wedged between the surface of the soil and the underside of a slab thereby making the retrieval of the stick more difficult and if the string is lost down the hole, as a practical matter, the stick may not be retrievable. Another consideration that must be taken into account is the need for a lure to be in contact with the soil so that the termites have easy access to the lure. If the soil has fallen away from beneath a slab and a wooden stick suspended from a string does not make contact with the soil, termites, even if present, may not be detected do to the inability of the termites to reach the lure. Thus, there has remained a need for an improved termite lure and method of treating termite colonies with termiticides where the treatment of the colonies with termiticides is performed beneath slabs.

SUMMARY OF THE INVENTION

The termite lure and method of treating termite colonies of the subject invention provides a solution to the problems currently encountered in the under slab treatment of termites with termiticides. The termite lure of the subject invention includes: a tubular container (preferably, a fiberboard sheet container) with an open lower end; a mass of entangled softwood fibers within the container; a rod having a length greater than that of the container that extends through the container; and a retainer, for slidably retaining the container on the rod, that leaves an opening at the lower end of the container through which termites can gain access to the mass of cellulose fibers (preferably, softwood fibers) within the tubular fiberboard sheet container. The termite lure of the subject invention is particularly well suit for treatment methods wherein holes are bored through a slab into the soil beneath the slab and the termite lure may also include an expansible plug that seals the hole in the slab. In one embodiment of the subject invention, the rod carrying the tubular container with its mass of cellulose fibers is attached to the expansible plug. The mass of cellulose fibers within the tubular container may be treated (e.g. saturated, coated, or impregnated) with a termiticide, preferably, a non-repellant termiticide.

In the method of the subject invention, the termite lure in placed down in a hole passing through a slab with the cellulose fibers within the tubular fiberboard container in contact with the soil beneath the hole. Preferably, the rod carrying the tubular container with its mass of cellulose fibers has a length greater than the depth of the hole formed through the slab and into the soil beneath the slab with the length being designed to accommodate any air gap between the surface of the soil and the underside of the slab such as that caused by the soil falling away from the slab in certain locations. Typically, the tubular container with its mass of cellulose fibers is located on the lower portion or at the bottom of the rod when the container is inserted into a hole in the slab. Where soil conditions permit, the rod is pushed into the soil beneath the hole in the slab and soil until the lower end of the tubular container and the mass of cellulose fibers within the container come in direct contact with the surface of the soil. Where soil conditions do not permit the rod to be pushed into the soil, the lower end of the tubular container may be located at the bottom of the rod and the rod with the tubular container can be inserted into the hole formed in the slab and soil beneath the slab until the lower end of the tubular container and the mass of cellulose fibers within the container come in direct contact with the surface of the soil. If required, the upper end of the rod may be cut off so that an expansible plug can be inserted into the hole in the slab to seal the hole. Where the termite lure is connected to the expansible plug and the rod can not be pushed down into the soil, the lower end of the rod may be cut off after the depth of the hole is determined to locate the container with its mass of cellulose fibers on the surface of the ground.

In the preferred method of the subject invention, when termite activity is detected in and/or around the termite lure, the soil beneath and surrounding the termite lure is treated with a termiticide (preferably, a non-repellant termiticide) to a desired depth. The mass of cellulose fibers within the container may also be treated with a termiticide (preferably a non-repellant termiticide) when the lure is initially installed or after the initial installation of the termite lure when termite activity is detected in and/or around the termite lure.

BRIEF DESCRIPTION OF THE DRAWINGS

FIG. 4 is a vertical cross section through a slab with a termite lure assembly utilizing the components of FIGS. 1 to 3 installed within a hole passing through the slab and into the soil beneath the slab.

FIG. 5 is a vertical cross section through a second embodiment of the termite lure assembly of the subject invention wherein the termite lure is secured to the expansible plug.

FIG. 6 is a vertical cross section through a slab with the termite lure assembly of FIG. 5 installed within a hole passing through the slab and into the soil beneath the slab.

DESCRIPTION OF THE PREFERRED EMBODIMENTS

Figure 1:
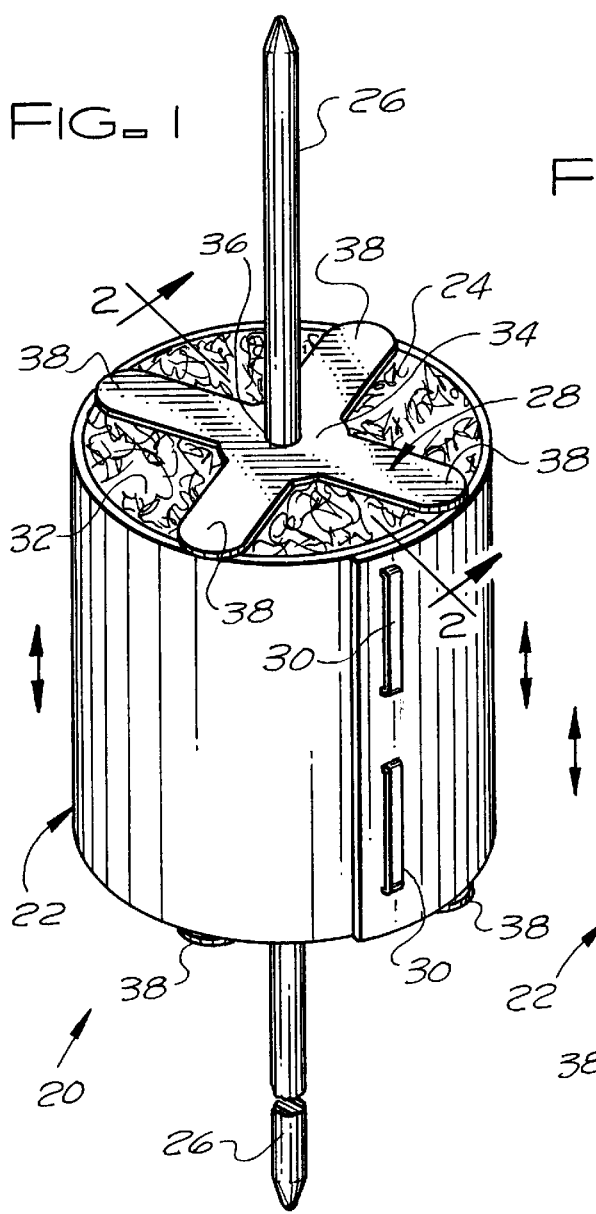
FIG. 1 is a perspective view of a termite lure of the subject invention.
Figure 2:
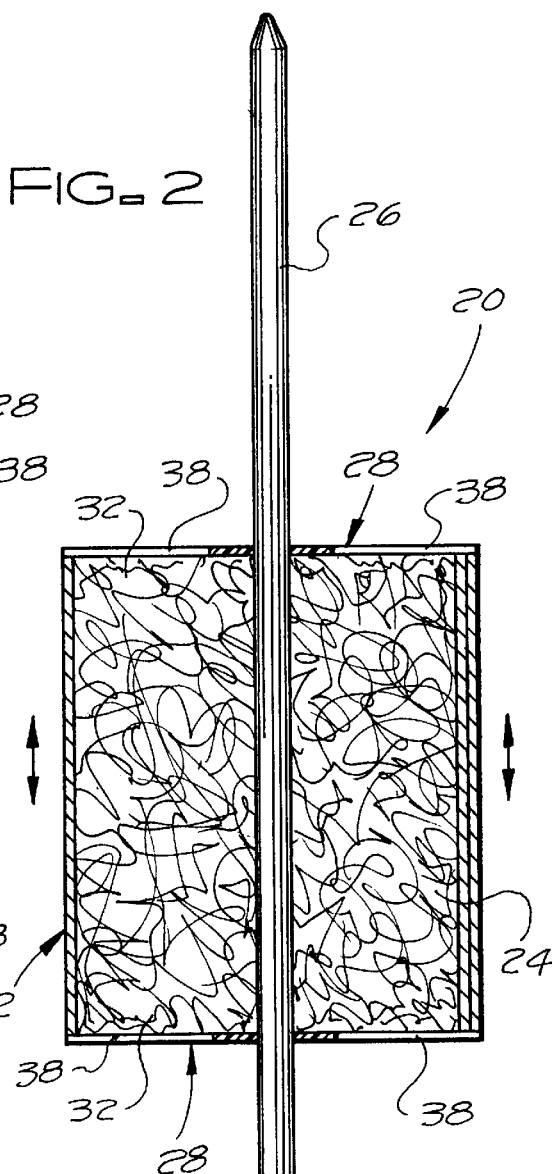
FIG. 2 is a vertical cross section of the termite lure of FIG. 1 taken substantially along lines 2—2 of FIG. 1.

Referring to FIGS. 1 and 2, the termite lure 20 of the subject invention includes: a tubular container 22 (preferably a tubular fiberboard sheet container); a mass 24 of entangled cellulose fibers within the container 22; a rod 26, having a length greater than that of the container 22, that extends through the container 22 along the longitudinal axis of the container 22; and upper and lower retainers 28, for slidably retaining the container 22 on the rod 26. The tubular container 22 is typically about 2½ to about 2¾ inches in diameter by about 2½ to about 3½ inches in length. The rod 26 is typically made of plastic so that it can be easily cut off to a desired length when being installed and, while the length of the rod may vary, the rod 26 typically has a length of about 8 to about 18 inches.

Preferably, the tubular container 22 is made of an uncoated fiberboard sheet of market pulp such as a sheet market pulp sold by Georgia Pacific Corporation under the trade designation "Leaf River 90 Softwood" "Southern Bleached Softwood" market pulp. This market pulp is a long fiber (typically 2.47 mm in average length with a coarseness of about 0.293 mg/m) bleached southern softwood pulp that is Elemental Chlorine Free (ECF) and typically includes 90% loblolly pine and 10% longleaf and slash. When made of fiberboard sheet material, the tubular fiberboard sheet container 22 is formed by spirally wrapping a sheet of uncoated market pulp into a tube with a hollow core. While as shown the tubular wall of the container 22 has only one layer with overlapping end portions that are stapled together with staples 30, the tubular wall of the container 22 may be formed of several spirally wrapped layers of the sheet with the end portion of the outer layer stapled to the underlying layers. The upper and lower ends 32 of the tubular fiberboard sheet container are open.

Preferably, the mass 24 of cellulose fibers within the tubular container 22 is a coherent deformable compressible mass of randomly oriented, entangled softwood fibers: that is held together by the entanglement of the fibers, that can be conformed to the interior of the container 22, and that has sufficient integrity to extend to and/or beyond the open upper and lower ends 32 of the container 22 to completely fill the container. In particular, it is desirable to have the mass 24 of cellulose fibers extending to and/or beyond the open lower end of the container 22 so that the mass 24 of cellulose fiber will be in contact with the soil when the termite lure 20 is placed within a hole passing through a slab for the detection and treatment of termites. The mass 24 of cellulose fibers exhibits a resilience that causes the mass of cellulose fibers to at least partially recover and, preferably, substantially entirely recover its precompressed thickness when the compressive forces are released, e.g. recovering from 50% to substantially all of its precompressed thickness.

The preferred softwood fibers used to form the coherent deformable mass 24 of randomly oriented, entangled cellulose fibers are predominately bleached loblolly pine fibers that are elemental chlorine free. One source of such fibers can be obtained by hammer milling uncoated free sheets of market pulp such as market pulp sold by Georgia Pacific Corporation under the trade designation "Leaf River 90 Softwood" "Southern Bleached Softwood" market pulp. This market pulp is a long fiber (typically 2.47 mm in average length,with a coarseness of about 0.293 mg/m) bleached southern softwood pulp that is Elemental Chlorine Free (ECF) and typically includes 90% loblolly pine and 10% longleaf and slash. While the mass of cellulose fibers may include a binder, preferably, the mass 24 of cellulose fibers is binderless.

Preferably, the mass of cellulose fibers is prepared from pressed sheets of digested, bleached and washed softwood fibers, e.g. loblolly pine fibers, such as the 42×45×3/32 inch sheets of market pulp discussed above that are sold by Georgia Pacific Corporation under the trade designation "Leaf River 90 Softwood" "Southern Bleached Softwood" market pulp. These pressed sheets are broken up, e.g. with a hammer mill, to release the softwood fibers from the sheets. The released softwood fibers are mixed with large quantities of air to form a mixture of air and softwood fibers that fluffs the released softwood fibers. The mixture of air and softwood fibers is then strained through a porous cloth or screen to form a coherent deformable compressible resilient mass of randomly oriented entangled softwood fibers that typically has the consistency of a cotton ball and is held together by the entanglement of the fibers. Termites can easily burrow into this mass of fibers and this mass of fibers is easy for termites to digest. The mass 24 of fibers easily absorbs moisture, pesticides or termiticides when applied to the mass and readily clings to the interior walls of the container 22. The mass is ready for the termites to eat, and unlike baits previously used, such as wood sticks, does not need separation or a fungus to break it down for easy consumption by the termites.

While other retainers could be used to hold the container 22 with its mass 24 of cellulose fibers on the rod 26, preferably, the upper and lower retainers 28 that hold the container on the rod 26 are mounted on the rod 26 by frictionally gripping the rod 26. The frictional resistance between the retainers 28 and the rod 26, to relative sliding movement between the retainers 28 and the rod 26, holds the retainers on the rod 26 while permitting the retainers to be slid along the rod when adjusting the position of the tubular container 22 on the rod 26. The retainers 28 each include a hub 34 with a central opening 36 that frictionally grips the rod 26 and a plurality of spaced apart spokes 38. The spokes 38 of the retainers are integral with and extend radially outward from the hubs 34 of the retainers to engage the upper and lower ends of the tubular wall of the tubular container 22. Thus, the tubular container 22 can be slid up or down the rod 26 along with the retainers 28 which hold the tubular container 22 on the rod 26. The spaced apart spokes 36 leave openings in the retainers 28 so that the mass 24 of cellulose fibers can extend to and/or through open upper and lower ends of the container. Thus, the mass 24 of cellulose fibers can be place in contact with the ground surface when installed and with no air gaps between the mass of cellulose fibers and the ground surface, the termites have ready access to the mass of softwood fibers within the tubular fiberboard sheet container 22. Preferably, the retainers are made of a thin resilient sheet material such as plastic or sheet metal material, e.g. a resilient sheet material about 1/32 of an inch in thickness.

Figure 3:
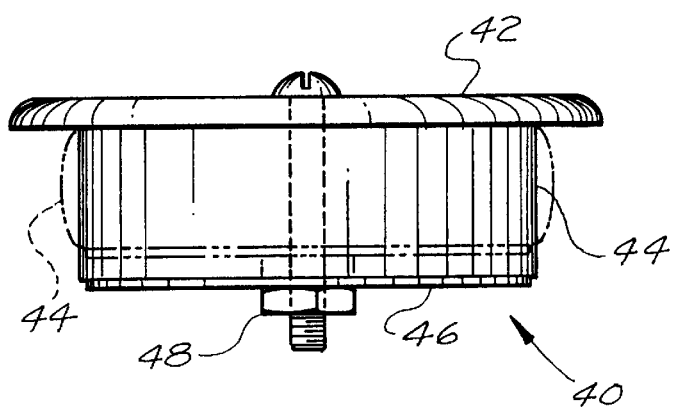
FIG. 3 is a side view of an expansible plug that can be part of a termite lure assembly utilizing the termite lure of FIG. 1.

The termite lure 20 may be used with an expansible plug 40, such as the expansible plug shown in FIG. 3. The expansible plug 40 includes a cover 42, a deformable and resilient cylindrical plug portion 44; a compression plate 46;

and a bolt and nut assembly 48. The cylindrical plug portion 44 is located intermediate the underside of the cover 42 and the compression plate 46. The cover 42 in greater in diameter than the cylindrical plug portion 44 and the compression plate 46 is typically a little less than but about the same diameter as the diameter of the cylindrical plug portion 44. The nut of the nut and bolt assembly 48 is integral with the compression plate. Accordingly, by tightening the bolt and nut assembly 48, the cylindrical plug portion 44 is compressed between the underside of the cover 42 and the compression plate 46 and expands radially as shown in phantom line in FIG. 3. When the bolt and nut assembly 48 is loosened the cylindrical plug portion 44 returns to its original diameter and shape. The cover 42 of the expansible plug 40 is typically about 3½ to 4 inches in diameter. When not compressed, the cylindrical plug portion 44 of the expansible plug 40 is typically about 2⅞ inches in diameter and about 1 inch in height.

FIG. 4 shows the termite lure 20 and the expansible plug 40 installed within a hole passing through a slab 50, e.g. a concrete slab, and into the ground or soil 52 beneath the slab. As shown, there is an air gap or air space 54 between the underside of the slab 50 and the surface of the ground 52 beneath the slab. The hole 56 through the slab 50 and into the ground beneath the slab 50 is typically about 3 inches in diameter. As discussed above the container 22 of the termite lure 20 is typically about 2½ to about 2¾ inches in diameter by about 3 to about 3½ inches in length and the rod 26 is typically about 12 to about 18 inches in length. Since the container of the termite lure 20 is smaller in diameter than the hole 56, the termite lure 20 can be inserted down into the hole 56 through the slab 50 and the lower end of the tubular container 22 and the bottom of the mass 24 of cellulose fibers within the container 22 can be located on the surface of the ground 52. Typically, when the termite 20 lure is inserted into the hole 56, the tubular fiberboard container 22 is positioned with the lower end of the container 22 at or adjacent the lower end of the rod 26. With the tubular container 22 in this position, if soil conditions permit the rod 26 can be pushed through the container 22 and into the ground 52 until the upper end of the rod 26 is at the desired level within the hole 56, e.g. about 1½ to 2 inches down in the hole 56 and clear of the bottom of the expansible plug 40. If the soil is too hard to insert the rod 26 down into the ground 52 or if rocks or other obstacles in the soil prevent the rod 26 from being pushed down into the ground until the upper end of the rod 26 is at a desired level within the hole 56, the upper end of the rod 26 can be cut off to locate the upper end of the remainder of the rod 26 at a desired height. The expansible plug 40 is then inserted into the hole 56 and the bolt and nut assembly 48 is tightened to expand the cylindrical plug portion 44 into sealing engagement with the wall of the hole 56 in the slab 50 to seal the hole and prevent water and debris from entering the hole.

FIGS. 5 and 6 show a termite lure/expansible plug assembly 60 of the subject invention wherein the termite lure 20 is secured to the expansible plug 40. In this embodiment of the invention the nut of the nut and bolt assembly 48 is an elongated nut. The bolt passing through the cover 42, the cylindrical plug portion 44, and the compression plate 46 is threaded into the upper end of the nut. The nut is integral with the compression plate 46. Accordingly, by tightening the bolt and nut assembly 48, the cylindrical plug portion 44 is compressed between the underside of the cover 42 and the compression plate 46 and expands radially as shown in phantom line in FIG. 5. When the bolt and nut assembly 48 is loosened the cylindrical plug portion 44 returns to its original diameter and shape. The termite lure 20 of this embodiment is the same as the termite lure of FIGS. 1 and 2, with one exception, the upper end of the rod 26 is threaded into (as shown in FIG. 5) or otherwise secured to the lower end of the nut of the nut and bolt assembly 48.

FIG. 6 shows the termite lure/expansible plug assembly 60 installed within a hole passing through a slab 50, e.g. a concrete slab, and into the ground or soil 52 beneath the slab. As shown, there is an air gap or air space 54 between the underside of the slab 50 and the surface of the ground 52 beneath the slab. The hole 56 through the slab 50 and into the ground beneath the slab 50 is typically about 3 inches in diameter. As discussed above, the container 22 of the termite lure 20 of the assembly 60 is typically about 2½ to about 2¾ inches in diameter by about 3 to about 3½ inches in length and the rod 26 is typically about 12 to about 18 inches in length. Since the termite lure 20 of the assembly 60 is smaller in diameter than the hole 56, the termite lure 20 can be inserted down into the hole 56 through the slab 50 and the lower end of the tubular container 22 and the bottom of the mass 24 of cellulose fibers within the container 22 can be located on the surface of the ground 52. Typically, when the termite 20 lure is inserted into the hole 56, the tubular container 22 is positioned with the lower end of the container 22 at or adjacent the lower end of the rod 26. With the tubular container 22 in this position, if soil conditions permit the rod 26 can be pushed through the container 22 and into the ground 52 until the cover 42 of the expansible plug 40 comes to rest on the upper surface of the slab 50. If the soil is too hard to insert the rod 26 down into the ground 52 or if rocks or other obstacles in the soil prevent the rod 26 from being pushed down into the ground until the cover 42 of the expansible plug 40 of the assembly 60 comes to rest on the upper surface of the slab 50, the lower end of the rod 26 can be cut off so that the rod 26 does not have to penetrate into the ground or so that the rod only has to penetrate a distance into the ground permitted by the soil conditions. The length of rod that must be cut off form the bottom of the rod 26 can be easily determined by inserting the assembly 60 into the hole 56 in the slab. The spacing between the bottom surface of the cover 42 and the upper surface of the slab 50 when the rod 26 will not penetrate further into the soil is the length that must be removed from the bottom of the rod 26 so that the lower end of the tubular container 22 and the mass 24 of cellulose fibers within the container rest on the upper surface of the ground. After the assembly 60 is inserted into the hole 56, the bolt and nut assembly 48 is tightened to expand the cylindrical plug 46 into sealing engagement with the wall of the hole 56 in the slab 50 to seal the hole and prevent water and debris from entering hole.

In the method of the subject invention, the termite lure 20 in placed down in a hole 56 passing through the slab 50 with the mass 24 of cellulose fibers within the tubular container 22 in contact with the soil beneath the hole. Typically, the tubular container 22 with its mass 24 of cellulose fibers is located on the lower portion of the rod 26 as the termite lure 20 is inserted into the hole 56 in the slab. The termite lure 20 is inserted into the hole 56 until the lower end of the tubular container 22 and the mass 24 of cellulose fibers within the container come in direct contact with the surface of the soil. When using the termite lure 20 as shown in FIG. 4, where the termite lure 20 is not secured to the expansible plug 40, the upper end of the rod 26 is extended up into the hole 56 so that the upper end portion of the rod 26 can be easily grasped to remove the termite lure from the hole to check for termite activity and/or treat the location with a termiticide. Typically, the upper end of the rod would be immediately below the underside of the expansible plug 40, e.g. about 1½ inches below the upper surface of the slab 50.

In the preferred method of the subject invention, when termite activity is detected in and/or around the termite lure 20, the soil beneath and surrounding the termite lure 20 is treated with a termiticide (preferably, a non-repellant termiticide) to a desired depth. The mass 24 of cellulose fibers (preferably softwood fibers) within the tubular container 22 may also be treated with a termiticide (preferably a non-repellant termiticide) when the lure is initially installed or after the initial installation of the termite lure when termite activity is detected in and/or around the termite lure. In the preferred method of the subject invention, the termiticide is non-repellent to termites and lethal or injurious to termites through matrix contact as well as through ingestion and/or transferal. An example of a preferred termiticide, which is non-repellent to termites and lethal to termites through contact as well as through ingestion and/or transferal, is a termiticide containing fipronil as its active ingredient. Aventis Environmental Science USA of Montvale, N.J. sells such a termiticide under the trade designation "TERMIDOR". Since the termites do not smell, see or feel this termiticide, the termites continue to pass freely through the treated area of the tunnel tube(s) picking up the termiticide and carrying the termiticide back to the colony nest. In the colony nest, other termites that contact the contaminated termites through feeding or grooming or through cannibalizing the termites killed by the termiticide become carriers of the termiticide thereby spreading the termiticide throughout the colony. The mass 24 of cellulose fibers within the tubular container 22 is treated with a termiticide by coating, saturating, impregnating or otherwise treating the mass of cellulose fibers with the termiticide.

In describing the invention, certain embodiments have been used to illustrate the invention and the practices thereof. However, the invention is not limited to these specific embodiments as other embodiments and modifications within the spirit of the invention will readily occur to those skilled in the art on reading this specification. Thus, the invention is not intended to be limited to the specific embodiments disclosed, but is to be limited only by the claims appended hereto.

What is claimed is:

1. A termite lure assembly for use in the treatment of termites in holes passing through slabs and the like, comprising:

a tubular container; the tubular container having a length and a longitudinal axis; the tubular container having an open lower end; the tubular container being a fiberboard sheet container;

a coherent mass of randomly oriented, entangled cellulose fibers contained within the tubular container; the cellulose fibers being softwood fibers;

a rod having a length greater than the length of the tubular container extending through the tubular container along the longitudinal axis of the tubular container; and retaining means for retaining the tubular container on the rod that leaves an opening at the lower end of the tubular container through which termites may gain access to the coherent mass of randomly oriented entangled cellulose fibers contained within the tubular container; the retaining means permitting the tubular container to be moved vertically relative to the rod; and the retaining means includes a first retaining member with a hub having a central hole therethrough that frictionally grips a lateral surface of the rod and spokes that extend radially outward from the hub and engage the lower end of tubular container.

2. The termite lure assembly according to claim 1, wherein:

the retaining means includes a second retaining member with a hub having a central hole therethrough that frictionally grips the lateral surface of the rod and spokes that extend radially outward from the hub of the second retaining member and engage the upper end of tubular container.

3. The termite lure assembly according to claim 1, wherein:

the coherent mass of randomly oriented entangled cellulose fibers contained within the container is treated with a non-repellant termiticide.

4. The termite lure assembly according to claim 1, wherein:

the coherent mass of randomly oriented entangled softwood fibers contained within the tubular container is a compressible, resilient mass of softwood fibers held together by the entanglement of the fibers; and the tubular container is made of a fiberboard sheet of softwood fibers.

5. The termite lure assembly according to claim 1, wherein:

the termite lure assembly includes an expansible plug adapted to be received within a hole passing through a slab wherein the expansible plug in an unexpanded state can be inserted into the hole passing through the slab and in an expanded state grips an internal surface of the hole passing through the slab to seal the hole passing through the slab.

6. The termite lure assembly according to claim 5, wherein:

an upper end of the rod is secured to an underside of the expansible plug.

7. The termite lure assembly according to claim 6, wherein:

the retaining means includes a second retaining member with a hub having a central hole therethrough that frictionally grips the lateral surface of the rod and spokes that extend radially outward from the hub of the second retaining member and engage the upper end of tubular container.

8. The termite lure assembly according to claim 7, wherein:

the coherent mass of randomly oriented entangled cellulose fibers contained within the tubular container is treated with a non-repellant termiticide.

* * * * *